May 7, 1929. G. A. STRAWSER 1,711,911
HAND OPERATED TYING DEVICE
Filed April 25, 1928 2 Sheets-Sheet 1

G.A.Strawser, Inventor
By C.A.Snow & Co
Attorneys

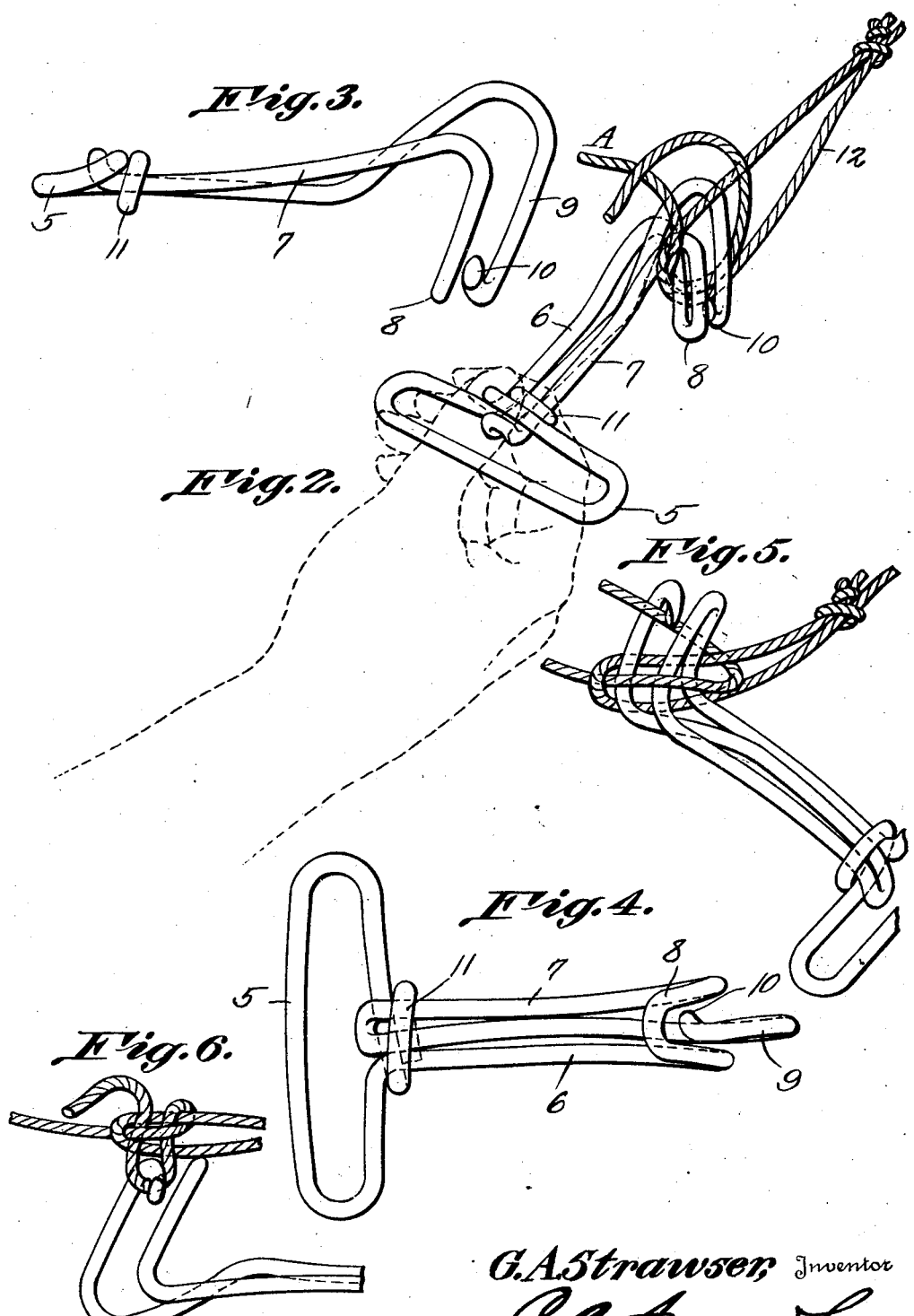

Patented May 7, 1929.

1,711,911

UNITED STATES PATENT OFFICE.

GEORGE A. STRAWSER, OF LIVERPOOL, PENNSYLVANIA, ASSIGNOR OF ONE-HALF TO DANIEL W. GOODLING, OF RICHFIELD, PENNSYLVANIA.

HAND-OPERATED TYING DEVICE.

Application filed April 25, 1928. Serial No. 272,712.

This invention has reference to a device designed for tying knots, the primary object of the invention being to provide an implement whereby a knot may be readily and easily tied in the binding cord or string used in binding bundles of fodder, corn, wheat or the like, thereby relieving the hands of the operator of undue strain.

Another object of the invention is to provide a device of this character so constructed that it may be readily and easily operated in the formation of the knot and one which will not require exceptional skill in the operation thereof.

A further object of the invention is to provide a device that will tie a knot which may be opened by pulling one end of the cord, it being unnecessary to work the end of the cord through the loop by hand to separate the cord from its bundle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a perspective view illustrating the position of the device after the initial movement of the device in tying a knot.

Figure 3 is a side elevational view of the device.

Figure 4 is a bottom plan view thereof.

Figure 5 is a view of the device after it has been twisted during the next step in the tying of a knot.

Figure 6 illustrates the position of the device after the final step in the tying of the knot.

Figure 1:
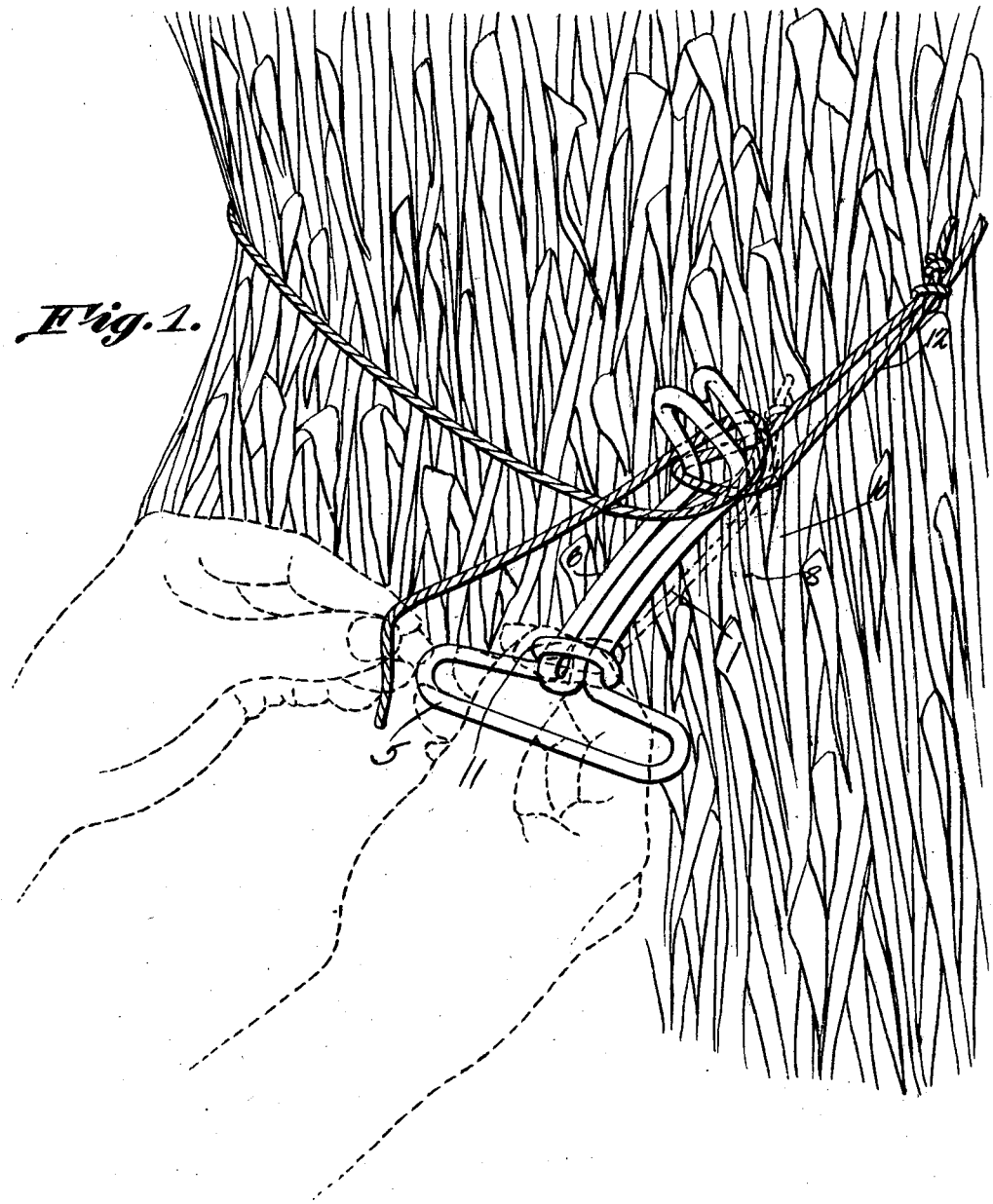
Figure 1 is a perspective view illustrating the manner of using the device.

Referring to the drawings in detail, the device embodies a length of wire material bent to provide a loop 5 defining a hand piece by means of which the device may be held by the operator. In forming the loop the length of wire is bent at a point adjacent to the end thereof leaving a substantially long section that extends outwardly from the loop portion 5 defining an arm 6.

The length of wire is also extended rearwardly to provide an arm 7 disposed in parallel spaced relation with the arm 6, the intermediate portion being formed into an outwardly extended hook 8, which is also in the form of a loop. The inner extremity of the arm 7 is extended towards the center of the handle section 5, from where the length of wire extends forwardly between the arms 6 and 7, the free end thereof being curved to provide a loop 9 having its extremity bent upwardly to provide a hook 10, the portion 9 as well as the hook 10 being spaced from the hook 8.

The arms 6 and 7 are held together by means of the loop 11 formed at one end of the length of wire material, which, as shown is pressed against the arms 6 and 7. In the use of the device the tie cord usually employed in tying bundles of corn or fodder is formed with a loop 12 at one of its ends, and the device is held in the right hand of the operator, the hook portions 8 and 9 extending upwardly. The loop 12 is held by the four fingers of the right hand, in a manner as shown by Figure 1 of the drawings, and the tie cord is carried around the bundle and looped around the hook portions 8 and 9, in a manner as shown by Figure 1.

The loop of the tie cord held between the fingers of the operator is now released and the cord is drawn tightly by pulling the free end thereof with the left hand. It follows that the cord is now in a position as shown by full lines in Figure 1.

With the cord and tying device in the position as shown by Figure 1, the device is twisted in a horizontal plane and in a clockwise direction which causes the hook member to catch under the uppermost loop of the tie cord and draw the loop through the loop 12, the device being in a position as shown by Figure 5, whereupon the free end of the tie cord is hooked under the hook 10 and the device is moved downwardly, the hooks 8 and 9 passing through the loop, to a position as shown by Figure 6, whereupon the knot is drawn tightly.

While I have shown and described the preferred form of the device, it is to be understood that the device may be constructed in various other ways within the scope of the invention.

I claim:

1. A knot tying implement including a length of wire material bent to provide a handle portion and a hook member, said length of wire material being extended rearwardly and secured adjacent to the handle and extended forwardly beyond the hook member and the end of the length of wire material extending laterally in spaced relation with the hook to engage the cord being tied, in the tying of a knot.

2. A knot tying implement including a length of wire material bent to provide a handle portion, an integral arm embodying spaced members, a laterally extended hook formed at the end of the arm, a portion of the length of wire extending adjacent to the handle and passing between the spaced members terminating in a hook disposed in parallel relation with the first mentioned hook to engage a cord to tie a knot.

In testimony that I claim the foregoing as my own, I have hereto affixed my signature.

GEORGE A. STRAWSER.